US011057494B2

(12) United States Patent
Zhuang et al.

(10) Patent No.: US 11,057,494 B2
(45) Date of Patent: *Jul. 6, 2021

(54) SEAMLESS CONTEXT SWITCH (71) Applicant: Google LLC, Mountain View, CA (US)

(72) Inventors: Peng Zhuang, Santa Clara, CA (US); Yi Meng, Fremont, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/883,462

(22) Filed: May 26, 2020

(65) Prior Publication Data

US 2020/0287988 A1 Sep. 10, 2020

Related U.S. Application Data (63) Continuation of application No. 15/445,320, filed on Feb. 28, 2017, now Pat. No. 10,715,629.

(51) Int. Cl.
H04L 29/08 (2006.01)
H04L 29/06 (2006.01)
G06F 9/445 (2018.01)

(52) U.S. Cl.
CPC ............ H04L 67/32 (2013.01); G06F 9/445 (2013.01); H04L 67/02 (2013.01); H04L 67/42 (2013.01)

(58) Field of Classification Search
USPC .................................................. 709/203, 227
See application file for complete search history.

(56) References Cited

U.S. PATENT DOCUMENTS 6,237,092 B1 * 5/2001 Hayes, Jr. ........... G06F 9/44505
709/221
6,330,572 B1 12/2001 Sitka
(Continued)

FOREIGN PATENT DOCUMENTS

CN 106354394 1/2017
CN 107688487 2/2018
EP 2105872 9/2009

OTHER PUBLICATIONS

EP Office Action European Applications No. 18159026, dated Oct. 18, 2019. 7 Pages.
(Continued)

Primary Examiner — Jude Jean Gilles
(74) Attorney, Agent, or Firm — Middleton Reutlinger (57) ABSTRACT Methods, systems, and apparatus, including computer programs encoded on a computer storage medium, for switching contexts in a browser-based application. In one aspect, a system includes a browser execution module configured to receive a request to load a browser-based application with first context data, request application data and the first context data, and receive the application data and the first context data. The system includes a state machine module configured to generate a state machine to access and store context data and load the application with the first context data by storing the first context data in the state machine. The system further includes a state change module configured to intercept a request to load the application with second context data for a second application account, request the second context data, and updated the application with the second context data by storing the second context data in the state machine.

19 Claims, 4 Drawing Sheets

(56) References Cited

U.S. PATENT DOCUMENTS

| | | | |
|---|---|---|---|
| 6,557,038 B1 | 4/2003 | Becker et al. | |
| 6,886,169 B2 | 4/2005 | Wei | |
| 7,882,501 B1 | 2/2011 | Carlson et al. | |
| 8,879,155 B1* | 11/2014 | Teller | G02B 27/14 359/630 |
| 9,058,189 B1 | 6/2015 | Queru | |
| 9,098,177 B2* | 8/2015 | Das | G06F 3/0484 |
| 9,578,111 B2 | 2/2017 | Kasivajjula et al. | |
| 10,469,497 B2* | 11/2019 | Yedidi | H04L 63/0876 |
| 10,715,629 B2* | 7/2020 | Zhuang | H04L 67/42 |
| 2002/0129096 A1 | 9/2002 | Mansour et al. | |
| 2003/0032417 A1 | 2/2003 | Minear et al. | |
| 2005/0066037 A1 | 3/2005 | Song et al. | |
| 2007/0101108 A1 | 5/2007 | Grossman et al. | |
| 2008/0033966 A1 | 2/2008 | Wahl | |
| 2012/0011237 A1* | 1/2012 | Bagwandeen | G16H 40/63 709/223 |
| 2012/0117499 A1* | 5/2012 | Mori | H04M 1/72583 715/765 |
| 2012/0209907 A1* | 8/2012 | Andrews | G06F 16/9535 709/204 |
| 2014/0115539 A1 | 4/2014 | Chou et al. | |
| 2015/0379478 A1 | 12/2015 | Klemm | |
| 2016/0259632 A1* | 9/2016 | Chang | G06F 8/38 |
| 2016/0335675 A1* | 11/2016 | Kshirsagar | H04L 63/102 |
| 2017/0118165 A1* | 4/2017 | Kumar | G06F 16/9537 |
| 2018/0007099 A1* | 1/2018 | Ein-Gil | G06F 9/468 |
| 2018/0075250 A1 | 3/2018 | Chasman et al. | |
| 2018/0248974 A1* | 8/2018 | Zhuang | H04L 67/32 |
| 2018/0260081 A1 | 9/2018 | Beaudoin et al. | |

OTHER PUBLICATIONS

Extended European Search Report issued in European Application No. 18159026.6 dated May 9, 2018. 7 Pages.

Chinese Patent Office; Office Action issued in Application No. 201810163819.8; 5 pages; dated May 24, 2021.

* cited by examiner

SEAMLESS CONTEXT SWITCH

BACKGROUND

The internet facilitates the exchange of information of users across the globe. This exchange of information enables the users to interact with browser-based applications that may be tailored to the accounts of each user.

SUMMARY

In some implementations, methods of the present disclosure include organizing and handling global context data so that application accounts of a browser-based application may be switched using the context data, without reloading the browser-based application. The context data may be organized and isolated hierarchically to be accessed when context switching occurs. The context data may be accessed as the browser-based application is loaded with first context data for a first application account. When a request for a context switch is detected at the browser-based application, the system can be configured to fetch and load second context data for a second application account so that the browser-based application may be updated without reinitializing or reloading the browser-based application.

One innovative aspect of the subject matter described in this specification is embodied in systems that include a browser execution module that is configured to receive a request to load a browser-based application with first context data for a first application account, in response to the request to load the browser-based application, request, from a server, (i) application data that, upon execution, causes the browser execution module to run the browser-based application in a browser and (ii) the first context data, and receive, from the server, the application data and the first context data. The systems also include a state machine module that is configured to generate, using the application data, a state machine that is configured to access and store context data, and load the browser-based application with the first context data by storing the first context data in the state machine. The systems further include a state change module that is configured to intercept a request to load the browser-based application with second context data for a second application account, in response to intercepting the request to load the browser-based application with the second context data, request, from the server, the second context data, and update the loaded browser-based application with the second context data by storing the second context data in the state machine.

Other implementations of this and other aspects include corresponding systems, apparatus, and computer programs, configured to perform the actions of the methods, encoded on computer storage devices.

Implementations may each optionally include one or more of the following features. For instance, the systems can include requesting the second context data without reloading the browser-based application using a second instance of the application data through a second request for the application data. The systems may also include loading the browser-based application without execution or reloading of the application data. In some aspects, the state machine module is further configured to generate a hierarchically-organized data structure that is configured to store context data and store the first context data in the hierarchically-organized data structure.

Further, the systems can include storing the first context data so that an application account may switch between the first context data and the second context data without requesting context data from the server. The systems can include context data that includes application account specific data and application account specific settings of the browser-based application. In certain aspects, the state machine module is configured to store the first context data in the state machine as a first state, and the state change module is also configured to store the second context data in the state machine as a second state.

Advantageous implementations can include one or more of the following features. Browser-based applications typically have a heavy browser client to support rich interactions with multiple components on a web page of the browser-based application. The heavy browser client results in excessive loading times of the web page due to the downloading of application files and contextual data that are bootstrapped to initialize the browser-based application for a particular application account. The methods of the present disclosure include controlling access and storage of top level contextual information so that loading times of browser-based applications are reduced. In certain aspects, the context data is stored globally, so that when contexts are switched in the browser-based application, previous contexts do not bleed into the current or updated context. Additionally, the systems can include methods of detecting and handling the switching of contexts within browser-based applications. The methods can include intercepting state change requests so that new context data is prepared before being loaded into the browser-based application. In this instance, the context data is readily available for browser-based applications when context switching occurs. For example, accounts may be switched within the browser-based application without reloading the browser-based application. The switching of accounts can therefore be performed more efficiently without the addition of latency that incurs as a browser-based application is reloaded.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

This document discloses methods, systems, and devices that are used to switch contexts in a browser-based application. As discussed in more detail below, the methods include downloading context data for a first application account. The first application account may be loaded as a browser-based application is initialized. A request to switch application accounts in the browser-based application may be received. Instead of holistically reloading and reinitializing the browser-based application, the methods can swap out the context data for the first application account with context data for a second application account. The context data for a second application account may be fetched and then updated within the browser-based application. For example, the user interface of the browser-based application may be updated based on the context data for the second application account. In this instance, the methods initialize the browser-based application once, as the browser-based application is not required to be downloaded for the second application account. As such, context data may be requested that is specific to the second application account, so that seamless context switching may occur without reloading the browser-based application, which is otherwise required.

Figure 1:
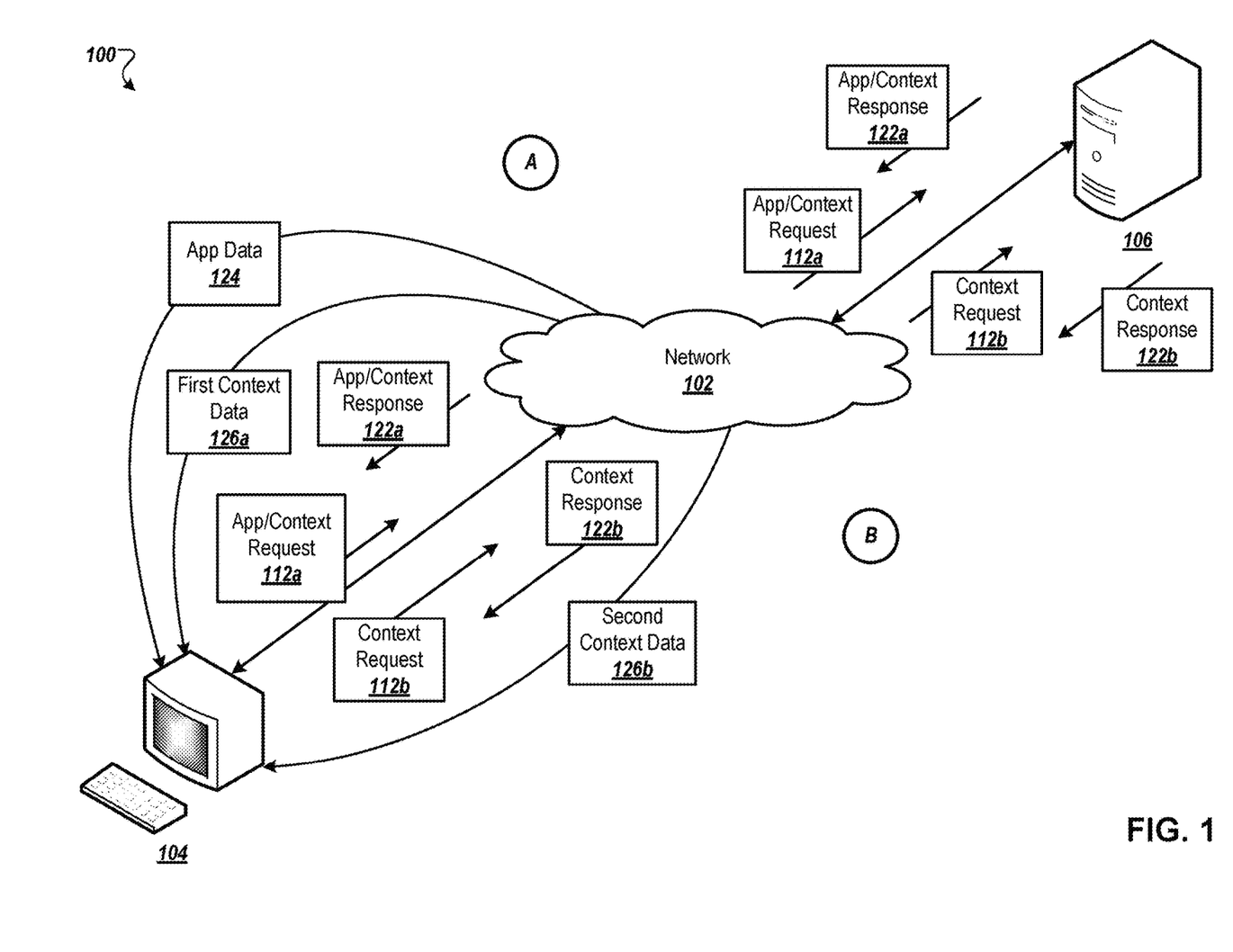
FIG. 1 is a block diagram of an example environment for context switching in a browser-based application.

FIG. 1 is a block diagram of an example environment 100 for context switching in a browser-based application. The example environment 100 includes a network 102, such as a local area network (LAN), a wide area network (WAN), the Internet, or any combination thereof. The network 102 connects a client device 104 and a server 106. The example environment 100 may include many different client devices 104 and servers 106.

A client device 104 is an electronic device that is capable of requesting application data, such as browser-based application data, and context data, such as context data for an application account, over the network 102. Example client devices 104 typically include personal computers, mobile communication devices, and other devices that can send and receive data over the network 102. A client device 104 typically is configured to run a user application, such as a web browser, to facilitate the sending and receiving of data over the network 102, but native applications executed by the client device 104 can also facilitate the sending and receiving of data over the network 102.

The client device 104 can transmit requests to the server 106 over the network 102. At event (A), the client device 104 may transmit a request for application data and context data 112a to the server 106. The request 112a for application data and context data may be generated at the client device 104 in response to receiving a request to load a browser-based application with first context data for a first application account. The client device 104 may request application data that is executed by the client device 104 to run the browser-based application in a web browser at the client device 104. Further, the client device 104 may request context data that corresponds to a first application account.

The client device 104 can receive the requested data from the server 106 over the network 102. The server 106 can provide a response 122a to the request 112a in which the response 122a includes the requested application data 124 and context data 126a corresponding to a first context of the first application account. The first context data may include application account specific data and application account specific settings of the browser-based application. For example, the application data may include executable code that runs a mail application, and the context data may correspond to particular settings of a particular account for the mail application.

The client device 104 can be configured to access and store the context data using the application data. Specifically, the client device 104 may be configured to generate a state machine that is configured to access and store the context data. In some aspects, the client device 104 uses the application data to generate the state machine. The state machine may be further configured to namespace the context data. In this instance, the context data may be easily identified as to where it fits within the state machine, (e.g., in which state, corresponding to which context, etc.). The client device 104 may also be configured to load the browser-based application with the received context data of the response 122a by storing the context data in the state machine.

In certain aspects, the client device 104 may be configured to receive a request to switch application accounts within the browser-based application. At event (B), the client device 104 intercepts a request to load the browser-based application with second context data for a second application account. For example, the client device 104 may intercept a request to switch accounts within the browser-based application, rather than allowing the request to switch accounts to be used to reload the browser-based application. In this instance, the client device 104 may fetch data specific to the second application account without fetching the application data again. In response to receiving the request to load the browser-based application with the second context data, the client device 104 can generate a request 112b for second context data to be transmitted to the server 106. Specifically, the client device 104 generates the request 112b so that the second context data may be swapped with the first context data within the same browser-based application instance. Instead of reinitializing the browser-based application data holistically, the client device 104 may load the second context data within the already executed current instance of the browser-based application, browser-based application via the state machine, without providing a second request for the application data 124. For example, a second instance of the initially received application data 124 may be executed by the client device 104 to update the browser-based application with the second context data 126b.

The client device 104 may receive a response 122b to the request 112b for the second context data. The response 122b can include the second context data 126b for the second application account such as preferences for a second account in a mail application. In certain aspects, the client device 104 updates the loaded browser-based application with the second context data 126b by storing the second context data 126b in the state machine. The state-machine may namespace the context data to differentiate between contexts. The context data may be namespaced to organize the context data into logical groups and to prevent collisions that can occur between the data that corresponds to different contexts. The namespacing of the context data enables the state machine to access specific data based on context information, application accounts, and the like. Specifically, the client device 104 may be configured to load the browser-based application with the second context data 126b without execution or reloading of the application data 124 received in response to the first request 112a.

Figure 2:
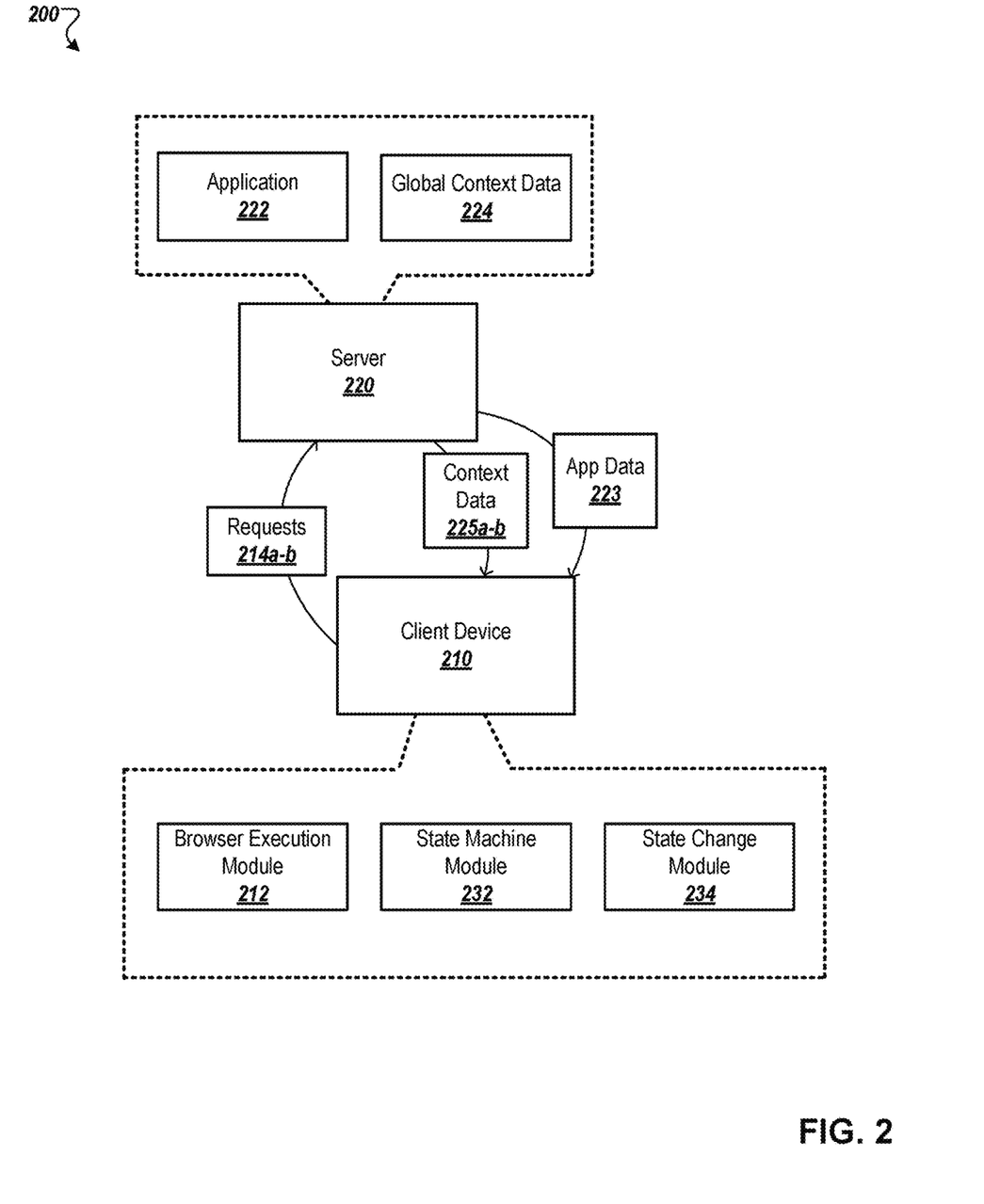
FIG. 2 is a block diagram illustrating examples of communications with a server.

FIG. 2 is a block diagram that illustrates examples of communications 200 with a server. The communications 200 with a server describe a client device 210 requesting data from a server 220, and in response to receiving the data, loading a browser-based application using the data. The client device 210 may use the received data to load different contexts in the browser-based application.

The client device 210 includes a browser execution module 212 that is configured to receive a request to load a browser-based application with first context data for a first application account. The browser execution module 212 may receive the request via input at the client device 210 such as user input via an external peripheral of the client device 210, a tactile graphical display in communication with the client device 210, and the like. The browser execution module 212 can also be configured to generate a request 214a for the application data and the first context data in response to receiving the initial request. The request

214*a* for the application data and the first context data may be generated at the client device 210 and transmitted to the server 220 over a network.

The request 214*a* can include a request for application data, that upon execution, causes the browser execution module 212 to run a browser-based application 222 in a browser at the client device 210. The request 214*a* may also include a request for the first context data. The first context data may be accessed via a stored global context data 224 of the server 220. In some aspects, the global context data 224 may be stored in a database in communication with the context sever 220, and accessed by the server 220 upon receiving requests for context data.

The server 220 can be configured to transmit the first context data 225*a* and the application data 223 to the client device 210 in response to the request 214*a*. The application data 223 and the first context data 225*a* may be received by the browser execution module 212 of the client device 210.

The client device 210 may also include a state machine module 232 that is configured to generate a state machine. The state machine module 232 can be configured to generate the state machine using the received application data 223. The generated state machine can be configured to access and store context data such as the first context data 225*a*. Additionally, the state machine module 232 can be configured to load the browser-based application with the first context data 225*a* by storing the first context data 225*a* in the state machine. In certain aspects, the state machine may be configured to namespace the context data. By namespacing the context data, the state machine ensures that when context is switched in the browser-based application, previous context does not bleed over in to the current context.

The client device 210 may further include a state change module 234. The state change module 234 can be configured to intercept a request at the client device 210 to load the browser-based application with second context data for a second application account. In other words, the client device 210 may receive a request to switch accounts within the browser-based application. In response to intercepting the request to load the browser-based application with the second context data, the state change module 234 may be configured to generate a request 214*b* for the second context data. The request 214*b* for the second context data may be transmitted by the client device 210 to the server 220 over the network. The second context data may be accessed via the stored global context data 224 of the server 220.

Using the methods of the present disclosure, the client device 210 requests only the second context data in the request 214*b*. As such, the client device 210 does not request the application data 223 a second time. Instead, the client device 210 requests data specific to a second application account and loads the second context data of the second application account with another instance of the application data 223 received in the initial response from the server 220.

The server 220 can be configured to transmit the second context data 225*b* to the client device 210 in response to the request 214*b*. The second context data 225*b* may be received by the state change module 234 of the client device 210. The state change module 234 can be configured to update the loaded browser-based application at the client device 210 with the second context data 225*b* by storing the second context data 225*b* in the state machine.

In certain aspects, the state machine module 234 can be configured to generate a hierarchically-organized data structure that is configured to store context data. For example, the hierarchy of the data can be organized by types of browser-based applications, different contexts, and data respective to each of the different contexts. In this instance, the browser-based applications may be highest within the hierarchically-organized data structure, and the data respective to each of the different contexts may be lowest within the hierarchically-organized data structure. By organizing the data structure in this way, the data structure may be traversed more easily once a type of browser-based application and/or particular context is known.

The state machine module 234 may be configured to store the first context data and the second context data in the hierarchically-organized data structure. The hierarchically-organized data structure may be used to store and handle the context data in an organized way. The switching of application accounts may be performed efficiently, to reduce latency when accessing the hierarchically-organized data structure without reloading the application. The methods performed by the client device 210 allow a plurality of different application accounts to be managed in a controlled yet accessible manner.

In some aspects, the state machine module 234 is configured to store the first context data 225*a* in the state machine as a first state and the second context data 225*b* in the state machine as a second state. In this instance, the loaded browser-based application may be updated with the different context data based on the stored states representing the different context data for different application accounts. The storing of the context data in the state machine as different states can aid in the prevention of overwriting context data. In certain aspects, the context data is refreshed when loading and/or updating of the context data in the browser-based application occurs. For example, the first context data stored as the first state may be refreshed when the loaded browser-based application is updated with the second context data.

Figure 3:
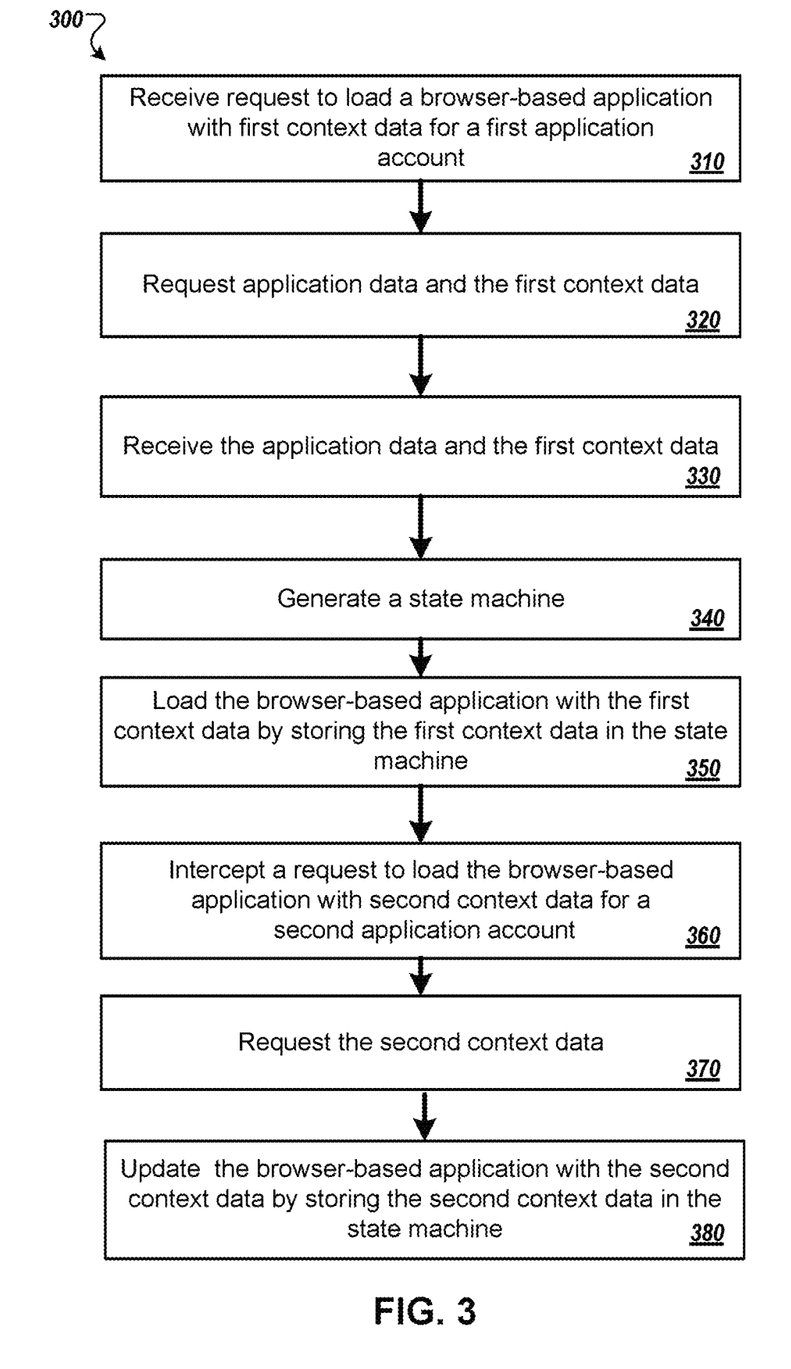
FIG. 3 is a flow chart of an example process for context switching in a browser-based application.

FIG. 3 is a flow chart of an example process 300 for context switching in a browser-based application. The process 300 can be performed by one or more servers or other computing devices. For example, operations of the process 300 can be performed by client device 104 of FIG. 1. Operations of process 300 can also be implemented as instructions stored on a non-transitory computer readable medium, and when the instructions are executed by one or more servers (or other computing devices,) the instructions cause the one or more servers to perform operations of the process 300.

At step 310, the client device receives a request to load a browser-based application with first context data for a first application account. The client device may receive the request as input via user interaction with the client device, from another device in communication with the client device, and the like. The request may indicate a particular browser-based application such as a mail application and first context data such as a first user's preferences for the mail application.

At step 320, the client device requests application data and the first context data. The client device can be configured to request application data corresponding to the browser-based application and the first context data corresponding to the first user from a server. The client device can be configured to automatically generate the request and automatically transmit the generated request to the server.

At step 330, the client device receives the application data and the first context data. The client device may be configured to receive the application data and the first context data from the server. The application data may be executed by the client device to run the requested browser-based application in a browser at the client device.

At step 340, the client device generates a state machine. The client device may be configured to generate a state machine using the application data. The state machine may be used by the client device to access and store context data such as the received first context data.

At step 350, the client device loads the browser-based application with the first context data by storing the first context data in the state machine. In some aspects, the initial loading of the browser-based application with the first context data is prefetched. In this instance, the latency of loading the browser-based application may be improved. For example, the first context data can be loaded in parallel to the loading of the browser-based application at the client device.

At step 360, the client device intercepts the request to load the browser-based application with second context data for a second application account. The request to load the browser-based application with the second context data can indicate the switching of accounts within the browser-based application.

At step 370, the client device requests the second context data. In certain aspects, the second context data is requested without reloading the browser-based application using a second instance of the application data through a second request for the application data. As such, the application data may be requested once, and loaded with each of the different context data at the client device.

In some aspects, the second context data is not requested in its entirety. Instead, a subset of the second context data may be requested by the client device. The subset of the second context data may be requested on an as needed basis. For example, the client device may be configured to determine a subset of critical context data to enable context switching within the browser-based application. In this instance, the client device may only request the determined subset of critical context data of the second context data from the server. As such, the client device can use the determined subset of critical context data to reduce the need to fetch unnecessary context data, which reduces network traffic, improves computer performance by reducing the load on the client device, and the like.

At step 380, the client device updates the loaded browser-based application with the second context data by storing the second context data in the state machine. By updating the previously loaded browser-based application with the second context data, the client device is able to switch accounts and/or contexts within the browser-based application without performing a full web page refresh of the browser-based application. The client device can be configured to maintain states corresponding to each of the different context data so that contexts and/or accounts may be switched during a single session of the browser-based application. For example, the client device may namespace the different context data so that the context data can be easily organized and accessed. The namespacing may be used to effectively reinforce the context data from bleeding over between different contexts (e.g., first context data bleeding into second context data).

Figure 4:
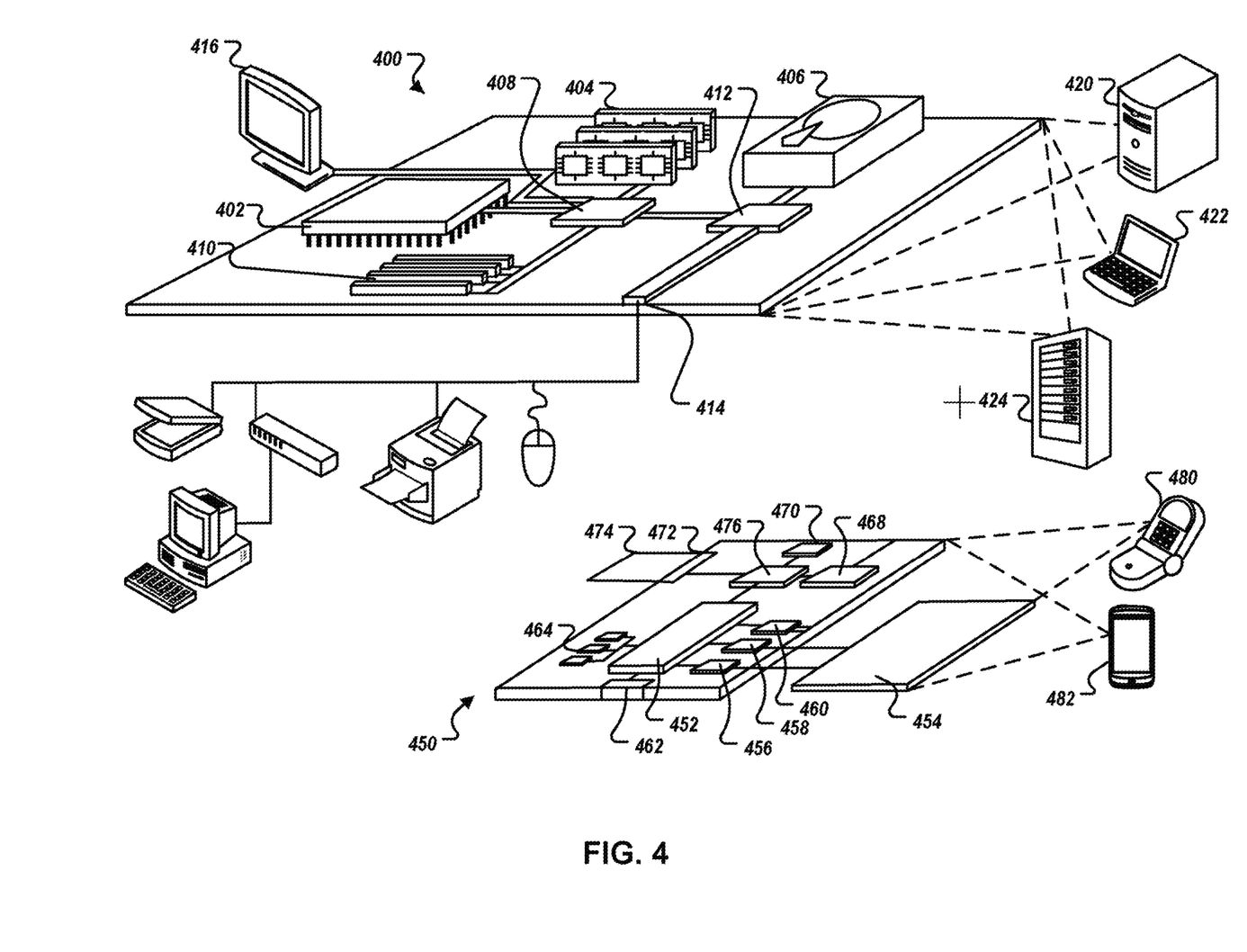
FIG. 4 is a diagram of an example of a computer device and a mobile computer device.

FIG. 4 is a diagram of an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 may process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 404, the storage device 406, or a memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 454, 464, 466, and 468, are interconnected using various buses, and several of the components may be mounted on a common motherboard or in other manners as appropriate.

The processor 452 may execute instructions within the computing device 440, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 448 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 may be implemented as one or more of a computer-readable medium or media, a volatile memory unit or units, or a non-volatile memory unit or units. Expansion memory 454 may also be provided and connected to device 450 through expansion interface 452, which may include, for example, a SIMM (Single In Line Memory Module) card interface. Such expansion memory 454 may provide extra storage space for device 450, or may also store applications or other information for device 450. Specifically, expansion memory 454 may include instructions to carry out or supplement the processes described above, and may include secure information also. Thus, for example, expansion memory 454 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 454, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS (Global Positioning System) receiver module 450 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

The invention claimed is:

1. A system comprising:
at least one processor; and
at least one memory storing instructions that, when executed, cause the least one processor to:
execute, via a client device, application data and first context data for a first application account to run a browser-based application in a browser;
during execution of the application data and the first context data for the first application account, receive a request to load the browser-based application with the application data and second context data for a second application account;

in response to receiving the request to load the browser-based application with the application data and the second context data for the second application account:

intercept the request to load the browser-based application with the application data and the second context data for the second application account;

store the first context data in a state machine;

transmit, to a server, an alternate request for the second context data without requesting the application data; and receive, from the server, and responsive to transmitting the alternate request, the second context data for the second application account; and in response to receiving the second context data for the second application account:

load the running browser-based application with the second context data without reloading the browser-based application.

2. The system of claim 1, wherein the instructions further cause the at least one processor to:

subsequent to loading the running browser-based application with the second context data:

receive a further request to load the browser-based application with the application data and the first context data for the first application account;

in response to receiving the further request to load the browser-based application with the application data and the first context data for the first application account:

intercept the further request to load the browser-based application with the application data and the first context data for the first application account;

store the second context data in the state machine;

retrieve, from the state machine, the stored first context data; and in response to retrieving the stored first context data for the first application account:

load the running browser-based application with the stored first context data without reloading the browser-based application.

3. The system of claim 2, wherein the state machine, including at least the stored first context data and the stored second context data, is stored locally on the client device.

4. The system of claim 2, wherein the instructions to store the first context data in the state machine cause the at least one processor to store the first context data in a portion of a hierarchically-organized data structure associated with the first context data; and wherein the instructions to store the second context data in the state machine cause the at least one processor to store the second context data in an additional portion of the hierarchically-organized data structure associated with the second context data that is in addition to the portion associated with the first context data.

5. The system of claim 1, wherein the instructions further cause the at least one processor to:

in response to intercepting the request to load the browser-based application with the application data and the second context data for the second application account:

generate the alternate request for the second context data, wherein the instructions to generate the alternate request cause the at least one processor to:

modify the request to load the browser-based application with the application data and the second context data for the second application account to only include the second context data for the second application.

6. The system of claim 1, wherein the request to load the browser-based application with the application data and the second context data for the second application account is received from within the browser-based application.

7. The system of claim 1, wherein the first context data includes first account data specific to the first application account and first account settings specific to the first application account, and wherein the second context data includes second account data specific to the second application account and second account settings specific to the second application account.

8. The system of claim 1, wherein the browser-based application is an electronic mail application, wherein the first application account is a first electronic mail account, and wherein the second application account is a second electronic mail account.

9. The system of claim 8, wherein the request to load the browser-based application with the application data and the second context data for the second application account comprises a request to switch from the first electronic mail account to the second electronic mail account.

10. A method implemented by one or more processors comprising:

executing, via a client device, application data and first context data for a first application account to run a browser-based application in a browser;

during execution of the application data and the first context data for the first application account, receiving a request to load the browser-based application with the application data and second context data for a second application account;

in response to receiving the request to load the browser-based application with the application data and the second context data for the second application account:

intercepting the request to load the browser-based application with the application data and the second context data for the second application account;

storing the first context data in a state machine;

transmitting, to a server, an alternate request for the second context data without requesting the application data; and receiving, from the server, and responsive to transmitting the alternate request, the second context data for the second application account; and in response to receiving the second context data for the second application account:

loading the running browser-based application with the second context data without reloading the browser-based application.

11. The method of claim 10, further comprising:

subsequent to loading the running browser-based application with the second context data:

receiving a further request to load the browser-based application with the application data and the first context data for the first application account;

in response to receiving the further request to load the browser-based application with the application data and the first context data for the first application account:

intercepting the further request to load the browser-based application with the application data and the first context data for the first application account;

storing the second context data in the state machine;
retrieving, from the state machine, the stored first context data; and
in response to retrieving the stored first context data for the first application account:
loading the running browser-based application with the stored first context data without reloading the browser-based application.

12. The method of claim 11, wherein the state machine, including at least the stored first context data and the stored second context data, is stored locally on the client device.

13. The method of claim 11,
wherein storing the first context data in the state machine comprises storing the first context data in a portion of a hierarchically-organized data structure associated with the first context data; and
wherein storing the second context data in the state machine comprises storing the second context data in an additional portion of the hierarchically-organized data structure associated with the second context data that is in addition to the portion associated with the first context data.

14. The method of claim 10, further comprising:
in response to intercepting the request to load the browser-based application with the application data and the second context data for the second application account:
generating the alternate request for the second context data, wherein generating the alternate request comprises:
modifying the request to load the browser-based application with the application data and the second context data for the second application account to only include the second context data for the second application.

15. The method of claim 10, wherein the request to load the browser-based application with the application data and the second context data for the second application account is received from within the browser-based application.

16. The method of claim 10, wherein the first context data includes first account data specific to the first application account and first account settings specific to the first application account, and wherein the second context data includes second account data specific to the second application account and second account settings specific to the second application account.

17. The method of claim 10, wherein the browser-based application is an electronic mail application, wherein the first application account is a first electronic mail account, and wherein the second application account is a second electronic mail account.

18. The method of claim 17, wherein the request to load the browser-based application with the application data and the second context data for the second application account comprises a request to switch from the first electronic mail account to the second electronic mail account.

19. A non-transitory computer-readable medium storing instructions that, when executed, cause at least one processor to:
execute, via a client device, application data and first context data for a first application account to run a browser-based application in a browser;
during execution of the application data and the first context data for the first application account, receive a request to load the browser-based application with the application data and second context data for a second application account;
in response to receiving the request to load the browser-based application with the application data and the second context data for the second application account:
intercept the request to load the browser-based application with the application data and the second context data for the second application account;
store the first context data in a state machine;
transmit, to a server, an alternate request for the second context data without requesting the application data; and
receive, from the server, and responsive to transmitting the alternate request, the second context data for the second application account; and
in response to receiving the second context data for the second application account:
load the running browser-based application with the second context data without reloading the browser-based application.

* * * * *